United States Patent

[11] 3,625,845

| [72] | Inventors | Yujiro Nakayama;<br>Masayuki Ogawa, both of Mie-ken, Japan |
|---|---|---|
| [21] | Appl. No. | 805,005 |
| [22] | Filed | Mar. 6, 1969 |
| [45] | Patented | Dec. 7, 1971 |
| [73] | Assignee | Mitsubishi Yuka Kabushiki Kaisha<br>Tokyo-to, Japan |
| [32] | Priorities | Mar. 8, 1968 |
| [33] | | Japan |
| [31] | | 43/14640;<br>May 31, 1968, Japan, No. 43/37181 |

[54] PARTICULATE GRAFTED CELLULOSE-POLYOLEFIN COMPOSITIONS
6 Claims, No Drawings

[52] U.S. Cl. .................................................. 204/159.12,
260/17.4 GC
[51] Int. Cl. ........................................................ C08f 33/08,
C08f 29/50
[50] Field of Search ........................................... 260/17.4
GC, 17.4 CL, 17.4 UC, 17.4 R, 876, 878;
204/159.12

[56] References Cited
UNITED STATES PATENTS

| 2,731,450 | 1/1956 | Serniuk et al. ................ | 260/80.7 |
| 2,841,569 | 7/1958 | Rugg et al. ..................... | 260/17.4 X |
| 2,991,269 | 7/1961 | Nozaki ........................... | 260/17.4 X |
| 3,401,129 | 9/1968 | McGinley ....................... | 260/23 |
| 3,406,127 | 10/1968 | Alexander ..................... | 260/2.3 |
| 3,485,777 | 12/1969 | Gaylord ......................... | 260/17.4 |
| 3,499,059 | 3/1970 | Molau et al. ................... | 260/876 |

OTHER REFERENCES

H. Burrell; " Solubility Parameters for Film Formers," Federation of Paint and Varnish Production Clubs, Official Digest, Vol. 27, No. 369, pp. 755 & 756 (Copy in Scientific Library).

*Primary Examiner*—Melvin Goldstein
*Attorneys*—Robert E. Burns and Emmanuel J. Lobato ABSTRACT: A composition for forming articles composed essentially of two thermoplastic polymers one of which is at least partially grafted on the other and a particle-form, cellulosic high-polymer substance impregnated with a thermoplastic polymer, and an effective method for producing such compositions which comprises imparting polymerization conditions to a mixture of a particle-form thermoplastic polymer, a particle-form, cellulosic high-polymer substance, and a vinyl monomer for producing the thermoplastic polymer.

PARTICULATE GRAFTED CELLULOSE-POLYOLEFIN COMPOSITIONS

BACKGROUND OF THE INVENTION

This invention relates generally to forming (molding and extruding) materials and more particularly to new compositions for forming articles comprising essentially two thermoplastic polymers one of which is at least partially grafted on the other and cellulosic high-polymer substances in particle form impregnated with thermoplastic polymers. This invention concerns also a new and advantageous method for producing these forming compositions.

The art of impregnating a cellulosic high-polymer substance, particularly wood, with a polymerizable vinyl compound and causing polymerization thereof within the wood thereby to produce an intimate composite material (wood-plastic composite material) of this wood and the polymer from this polymerizable vinyl compound is known. In general, such wood-plastic composite materials known heretofore have been made through the use of wood materials in a self-sustaining or structural form as, for example, boards, slats, strips, and postlike or sticklike pieces and have been used in applications where the excellent physical properties and external appearance of wood can be utilized.

While the prices of high-grade woods are rising sharply, wood powders are generally of low price, except for those of special nature, and constitute a class of starting or source materials which are readily available in large quantities. On one hand, thermoplastic polymers, particularly polyolefin polymers, are also inexpensive and are starting materials which can be supplied in large quantities because of the low price and availability of raw material monomers and great progress in polymerization technology.

In view of these circumstances, it would seem feasible to produce an inexpensive forming material by combining together a wood powder and a thermoplastic polymer, particularly a polyolefin polymer. Such a procedure, however, will not produce a desirable result. The reason for this is that when a composition composed of a thermoplastic polymer, for example, a polyolefin polymer, and a wood powder is heated and formed, the article thus formed frequently has poor compatibility between its polymer and wood powder, whereby the mechanical strength of the article is low and, moreover, the hardness thereof is poor.

SUMMARY OF THE INVENTION

It is an object of the present invention to overcome these difficulties by combining together a thermoplastic polymer, particularly a polyolefin polymer and a thermoplastic polymer compatible therewith and, moreover, by using a cellulosic high-polymer substance in particle form impregnated with a thermoplastic polymer.

That is, an object of the invention is to apply the aforedescribed technique of producing composite materials to cellulosic high-polymer substances in particle form such as wood powders which, themselves, do not having a self-sustaining or form-sustaining property, thereby to produce a new forming material.

Another object of the invention is to provide an advantageous method for producing forming materials of the instant character.

According to the present invention in one aspect thereof, briefly summarized, there is provided a composition for forming articles which consists essentially of first, second, and third thermoplastic polymers and a particle-form, cellulosic substance impregnated with the third thermoplastic polymer, the second thermoplastic polymer being grafted at least partially on the first thermoplastic polymer.

According to the present invention in another aspect thereof, there is provided a method of producing compositions as described above, which method comprises imparting polymerization conditions to a mixture of a particle-form, cellulosic high-polymer substance, a cellulosic high polymer substance in particle form, a thermoplastic polymer in particle form, and a vinyl monomer and carrying out polymerization in a manner such that a polymerizable, free, continuous phase of the vinyl monomer is substantially nonexistent in the reaction mixture thereby to obtain a product which is substantially in the form of loose particles.

The nature, details, and utility of the invention will be more clearly apparent from the following detailed description, beginning with general considerations and concluding with specific examples of practice constituting preferred embodiments of the invention.

DETAILED DESCRIPTION

As mentioned hereinabove, the polymer component of the composition according to the invention comprises two polymers one of which is at least partially grafted on the other, and the filler component is a cellulosic high-polymer substance in particle form impregnated with a thermoplastic polymer.

According to our separate investigation, a composition comprising a polyolefin polymer from among the first thermoplastic polymers, a thermoplastic polymer which is compatible therewith and has a second-order transition temperature exceeding 40° C., and a cellulosic high-polymer substance in particle form has been found to be highly interesting as a new starting material suitable for use as a forming material. Furthermore, by using the above mentioned two polymer components in the form of graft polymers, it is possible to attain a remarkable improvement in the physical properties, particularly the rigidity, of the formed article produced thereby.

By using cellulosic high-polymer particles impregnated with a thermoplastic polymer as the cellulosic high-polymer substance in particle form according to the invention, the physical properties, particularly the rigidity and thermal shrinkage, of the resulting formed article are remarkably improved in comparison with those attainable by the above-mentioned two methods. Furthermore, the moisture absorptivity, dimensional stability and consistency of articles formed from this composition are greatly improved.

As mentioned above, the first component of the composition according to the invention is a thermoplastic polymer, which is herein referred to as "the first thermoplastic polymer" and designates homopolymers and copolymers of vinyl monomers. Furthermore, the term "vinyl monomers" is herein used to designate polymerizable, unsaturated monomers each having at least one ethylenically unsaturated bond. A representative example of this first thermoplastic polymer is a polyolefin polymer. Examples of polyolefin polymers are homopolymers and copolymers of olefins such as ethylene, propylene, and butene-1. This polyolefin polymer, furthermore, may be a copolymer of olefin and a small quantity of a comonomer, other than olefin, such as vinyl acetate, acrylic acid or an ester thereof, and methacrylin acid or an ester thereof.

Other representative examples of this first thermoplastic polymer are polymers of vinyl monomers other than olefin such as, for example, polyvinyl chloride, poly (methacrylate esters) (particularly lower alkyl methacrylates and preferably methyl methacrylate), poly (acrylate esters) polystyrenes, polyvinyltoluenes, poly α-methylstyrene, and poly(styrene-acrylonitrile)s.

The second thermoplastic polymer which is the second component of the composition according to the invention is essentially a polymer of thermoplastic property similarly as in the case of the above defined first thermoplastic polymer and has, essentially, the same definition as the first thermoplastic polymer. However, when a polyolefin polymer is selected for the first thermoplastic polymer, the second thermoplastic polymer is preferably a different polymer. A thermoplastic polymer which is compatible with the polyolefin polymer and has a second-order transition temperature above 40° C. is particularly preferable, specific examples of such polymers are those named above as examples of first thermoplastic polymers of vinyl monomers other than olefin. Examples of particularly suitable polymers are polymers of styrene, lower alkyl methacrylates, and divinyl benzene.

A feature of the composition according to the invention is that this second thermoplastic polymer is grafted at least partially on the first thermoplastic polymer. This description (i.e., "this second thermoplastic polymer is grafted at least partially on the first thermoplastic polymer") designates a composition obtainable by causing the vinyl monomer for producing the second thermoplastic polymer to be graft polymerized as a graft on the first thermoplastic polymer, which is the base (trunk) polymer.

Depending on the graft polymerization technique, a polymer of the vinyl monomer used as a graft, itself, is produced as a byproduct in some cases. In the composition according to the invention, graft polymers in which such a byproduct polymer is coexisting can also be used, and satisfactory results can be obtained provided that the two polymer constituents are grafted at least partially. The graft polymers can be prepared by any of the generally known methods such as the preirradiation method, the simultaneous irradiation method, and the air oxidation method.

The third component in the composition according to the invention is a composite material prepared by impregnating a cellulosic high-polymer substance in particle form with a third thermoplastic polymer. While woods are representative materials suitable for use as the cellulosic high-polymer substance, other cellulosic materials such as refined cellulose itself, straw, pulp, and cellulose fibers can also be used depending on the necessity. The third thermoplastic polymer for impregnating the cellulosic material may be the same as or different from the above defined first and second thermoplastic polymers.

Furthermore, this third thermoplastic polymer, differing from the second thermoplastic polymer, is not necessarily a polymer having a second-order transition point above 40° C.

In general, however, it is preferable that this third polymer be the same as the second thermoplastic polymer. Accordingly, the specific types thereof are the same as those indicated by the examples enumerated hereinabove for the first and second thermoplastic polymers.

An effective and convenient procedure for carrying out the impregnation with this thermoplastic polymer comprises impregnating the cellulosic high-polymer substance with vinyl monomer corresponding thereto and causing this vinyl monomer to polymerize within the cellulosic high-polymer substance thereby to form the polymer in situ. The polymerization in this case also can be carried out by means of the polymerization starting procedure adopted in the aforedescribed graft polymerization.

Depending on the polymerization conditions, there is the possibility of the thermoplastic polymer being grafted at least partially to the cellulosic high-polymer substance. Accordingly, the description "thermoplastic polymer impregnation" herein set forth does not necessarily mean only a physical mixture. Furthermore, the existence of a portion of the polymer which has not impregnated the cellulosic substance and is admixed as a byproduct is not detrimental.

This cellulosic high-polymer substance impregnated with thermoplastic polymer is in particle form. This substance in particle form can be prepared by using as a starting material a cellulosic high-polymer substance which is already in particle form and forming the thermoplastic polymer in situ as this particle form is maintained.

The term "particle form" as herein used designates a physical state of a granular substance wherein the substance has a sufficiently small particle size whereby this substance, itself, becomes an aggregate of substantially free fluidity. This term includes states of substances as fine as powder form. More specifically, it is desirable, in general, that the particle size be smaller than 10 mesh (Tyler standard sieve).

When the particle size of this particle-form, cellulosic high-polymer substance is large, for example, of the order of from 10 to 30 mesh, the resulting formed article produced from the composition according to the invention exhibits an interesting pattern of the cellulosic substance as viewed from the outside.

The blending proportions of the three components of the composition of the invention can be selected in accordance with the desired properties of the articles to be formed from this composition. We have found that, generally speaking, it is desirable that from 10 to 150 parts, particularly from 20 to 100 parts, of the particle-form, cellulosic high-polymer substance impregnated with the third thermoplastic polymer (the third component) be blended with 100 parts of a mixture of the first thermoplastic polymer (the first component) and the second thermoplastic polymer (the second component). It is further desirable that the ratio by weight of the quantities of the first and second components in the above-mentioned mixture be from 5:95 to 95:5, particularly from 20:80 to 80:20. The ratio by weight of the quantities of the cellulosic high-polymer substance and the impregnated thermoplastic polymer is from 98:2 to 2:98, preferably from 80:20 to 20:80.

The blending of these three components can be carried out according to any mode of procedure by which mutually uniform mixing of the components is possible. For example, the components in the form of respectively separate particles in loose state can be dry mixed by means such as a Nauta mixer or can be melt blended by means of rolls or an extruder.

The composition for forming articles of the invention, however, is most advantageously prepared by the following method according to the invention.

This method is characterized in that polymerization conditions are imparted to a mixture of the particle-form cellulosic high-polymer substance, the thermoplastic polymer in particle form, and a vinyl monomer and in that polymerization is carried out substantially without the existence of a polymerizable, free, continuous phase of this vinyl monomer thereby to prepare a product in the form of substantially loose particles.

Thus, a feature of the method according to the invention is the use of a particle-form substance such as wood powder for the cellulosic high-polymer substance. In known wood-plastic composite materials, it has been relatively difficult to cause the monomer to penetrate thoroughly into the wood interior because of the use of relatively bulky pieces of wood. However, when wood in particle form is used as in the present invention, there is no difficulty relative to thorough impregnation.

Ordinarily, the monomer is caused to impregnate the cellulosic high-polymer substance by the steps of deaerating the cellulosic substance, causing the same to contact the monomer under reduced pressure, and then returning the pressure to atmospheric pressure or applying positive pressure. By the practice of the present invention, however, there are cases depending on the particle size of the cellulosic substance in which causing the monomer and the cellulosic substance merely to contact each other is sufficient. Furthermore, when a solvent is additionally used during the impregnation process, it can be easily removed.

Another feature of the method according to the invention is that the polymerization conditions are imparted to the mixture of the particle-form, cellulosic high-polymer substance, the vinyl monomer, and the vinyl polymer in particle form. This gives rise to the possibility of a part of the vinyl monomer graft polymerizing with respect to the coexisting vinyl polymer in particle form. As a result the cellulosic high-polymer substance, the vinyl polymer existing from the beginning, and a vinyl polymer formed by the polymerization of the vinyl monomer are present in an intimate relationship within the product thus prepared and have excellent mutual compatibility, and articles formed from this composition do not exhibit defects such as phase separation due to changes occurring with the elapse of time.

Still another feature of the invention is that the products thus prepared are obtained in the form of particles in a substantially loose or separable state. More specifically, these products are obtained as an aggregate of substantially free fluidity either already in the form of fully separated and loose particles or in a form which can become separated and loose particles merely by being subjected to light crushing or impact. In view of the fact that the objective of the present invention is to present forming materials, this feature is of high importance.

As mentioned herein before, wood powders are the most representative starting materials for the particle-form, cellulosic high-polymer substance in the practice of the method of the invention. In addition, cellulosic materials such as shredded straw in the form of pulp and pulps can also be effectively used. The proportion of this cellulosic high-polymer substance in the particle-form mixture thereof with the thermoplastic polymer is from 2 to 98 percent, preferably from 8 to 70 percent by weight.

Another starting material is a thermoplastic vinyl polymer in particle form which was referred to hereinbefore as the first thermoplastic polymer. Accordingly, a polyolefin polymer is particularly preferable. This polymer is used in a "particle form" (preferably of a particle size below 10 mesh) similarly as the cellulosic high-polymer substance.

The vinyl monomer constituting another essential starting material for the method of the invention and defined hereinbefore is preferably of character such that it is in liquid state under the polymerization conditions. Furthermore, in view of the aim of the invention to obtain products in particle form, this monomer should be of a character such that it will not appreciably dissolve the vinyl polymer under the polymerization conditions, or otherwise it should be used in a solution the solvent of which will not appreciably dissolve the polymers in the system under the polymerization conditions.

Specific examples of such monomers are styrene, acrylic esters, methacrylic esters, vinyl acetate, acrylonitrile, divinylbenzene, and vinylpyridine. These and other like monomers can be used singly or in the form of mixtures of two or more thereof. The selection from among these monomers of a monomer or a monomer mixture which will produce a thermoplastic polymer having a second-order transition temperature above 40° C. will be obvious to those skilled in the art from the teachings of accumulated knowledge relating to polymer chemistry.

In the method according to the invention, a mixture of the above-described essential starting materials is subjected to polymerization conditions, the resulting polymerization being carried in a manner such that there is substantially no existence of a polymerizable, free, continuous phase of the vinyl monomer. Here, the phrase "there is substantially no existence of a polymerizable, free, continuous phase of the vinyl monomer" means that the monomer does not exist in a state such that a continuous phase of the polymer from this monomer will be formed after completion of the polymerization, and the product thus formed, instead of being loose, separable particles, will become lumps having a tenacity whereby they cannot be easily crushed or ground.

Accordingly, the ordinary technique according to the invention is to subject this monomer to the polymerization conditions in a state wherein most, if not all, of it is bound by sorption, i.e., absorption or adsorption, to a particle-form mixture of the particle-form, cellulosic high-polymer substance and the thermoplastic vinyl polymer in particle form. For example, a suitable procedure is to use a monomer in a quantity of the order of from 10 to 150 parts by weight with respect to 100 weight parts of a particle-form mixture of the cellulosic high-polymer substance and the thermoplastic vinyl polymer.

In order to prevent the polymerizable, free, continuous phase of the monomer from coming into existence, it is possible to destroy the continuous phase due to excessive monomer by thorough agitation preferable in the presence of a diluent. Furthermore, it is possible also, even when a free, continuous phase of excessive monomer is present, to cause this phase to remain in an unpolymerized state by controlling the manner in which the polymerization conditions are imparted (for example, by carrying out so-called preirradiation in irradiation polymerization).

While the polymerization can be carried out by any of various modes of practice, a preferable method is that by irradiation with ionizing radiation. It is possible in this case also to carry out polymerization by the so-called preirradiation method in which the particle form mixture of the cellulosic high-polymer substance and the thermoplastic vinyl polymer is irradiated with ionizing radiation and then caused to contact the vinyl monomer.

By using a solvent when carrying out these reactions, it is possible in some cases to increase further the reaction efficiency thereby to produce highly desirable results. Furthermore, it is possible to reduce the quantity of required irradiation by adding to the reaction a compound having a catalytic action such as azobisisobutyronitrile or benzoyl peroxide. The ionizing radiation rays for causing polymerization is of known character such as beta, gamma, and X-rays and beams of neutrons and accelerated electrons or heavy particles.

Various changes and modifications can be made in the method of the invention. For example, it is possible to add additives such as a filler, dyes or pigments and a stabilizer as necessary, and it is possible also to color beforehand the particle-form high-polymer substance.

Furthermore, the forming composition according to the invention can be changed and modified in various ways. For example, other fillers, dyes, stabilizers, plasticizers, and other polymers as necessary may be blended with the composition. Moreover, these changes and modifications can be made with respect to each of the essential components of the compositions.

The polyolefin composition thus obtained can be formed by heating (e.g., at from 160° to 190° C.) and (or) by applying pressure thereto into various articles each consisting essentially of a matrix of a phase composed of a substantially homogeneous interfused body of polymers and a polymer-impregnated, particle-form, cellulosic high-polymer substance uniformly dispersed throughout the matrix.

In order to indicate still more fully the nature and utility of the invention, the following specific examples of practice constituting embodiments thereof are set forth, it being understood that these examples are presented as illustrative only and they are not intended to limit the scope of the invention.

The measurements of physical properties relating to the following examples were made as indicated below.

| | |
|---|---|
| Hardness: | ASTM. D785-51 (L-scale) |
| Rigidity: | ASTN. D747 (6° bend) |
| Heat shrinkage: | 190° C./press forming |
| Dimensional stability: | 20° C./in water/24 hrs. |

EXAMPLE 1

A graft polymer of a polypropylene (PP) (specific gravity = 0.91, melt index (M.I.) = 4) and methyl methacrylate (MMA) and a composite material obtained by impregnating wood powder (pine, 10 mesh and smaller) with methyl methacrylate and causing the MMA to polymerize were dry mixed (by means of a Nauta mixer) in various proportions as indicated in table 1. The resulting mixture was press-formed for 10 minutes at a temperature of 190° C., and the article thus formed in each case was tested for its physical properties.

Wood powder was added to a polypropylene/methyl methacrylate graft polymer, and the resulting samples were tested in the same manner.

TABLE 1

| Run No. | Composite (percent by weight) | | | | Rigidity (kg./cm.²) | Dimensional stability (percent) |
|---|---|---|---|---|---|---|
| | PP/MMA graft polymer PP:MMA ratio | Wood powder/PMMA composite material Wood powder:MMA ratio | | Wood powder | | |
| 1 | 1:1 | 70 | | 30 | 17,400 | 3.2 |
| 2 | 1:1 | 80 | 90:10 | 20 | 17,500 | 0.5 |
| 3 | 1:1 | 70 | 98:2 | 30 | 18,200 | 0.6 |
| 4 | 1:1 | 70 | 90:10 | 30 | 22,000 | 0.6 |
| 5 | 1:1 | 60 | 90:10 | 40 | 23,800 | 0.7 |
| 6 | 1:1 | 70 | 2:98 | 30 | 12,500 | 0.2 |
| 7 | 3:25 | 55 | 67:33 | 45 | 23,500 | 0.8 |

EXAMPLE 2

Styrene acrylonitrile, and divinylbenzene were respectively graft polymerized, each with a graft rate of 30 percent, with respect to a polypropylene (PP) (specific gravity = 0.91, M.I. = 4). With each of the copolymers thus obtained, wood powder [(sugi (cryptomeria japonica) 10 mesh and smaller)] was mixed in a Nauta mixer. The resulting mixture was press formed into a sample which was subjected to the tests indicated in table 2.

Next, separate lots of the wood powder were respectively impregnated with the above named vinyl monomers, which were then polymerized to a degree of 10 percent to produce wood-powder composite materials. Each of these materials was mixed with the polypropylene/vinyl monomer graft polymers obtained in the above described manner thereby to prepare samples.

In addition, samples of the polypropylene only and of a combination prepared by merely mixing the polypropylene, a polymer of a vinyl monomer PVM named above, and the wood powder were formed and subjected to the same tests.

The results of the tests on these samples were as indicated in table 2.

TABLE 2

| Run No. | Monomer used | PP | PP graft polymer | Wood powder composite | Wood powder | PVM | Hardness | Rigidity (kg./cm.²) | Dimensional stability (percent) | Outer appearance |
|---|---|---|---|---|---|---|---|---|---|---|
| 1 | | 100 | | | | | 67 | 10,500 | 0 | |
| 2 | Styrene | 33 | | | 33 | 34 | 70 | 10,500 | 4.2 | Aventurine. |
| 3 | do | | 100 | | | | 81 | 11,100 | 0 | Same as PP. |
| 4 | do | | 70 | | 30 | | 83 | 15,000 | 3.8 | Aventurine beautiful. |
| 5 | do | | 70 | 30 | | | 84 | 18,500 | 0.5 | Do. |
| 6 | Acrylonitrile | | 70 | | 30 | | 84 | 15,500 | 3.7 | Do. |
| 7 | do | | 70 | 30 | | | 92 | 24,200 | 1.0 | Do. |
| 8 | Divinylbenzene | | 70 | | 30 | | 82 | 16,100 | 3.7 | Do. |
| 9 | do | | 70 | 30 | | | 87 | 21,000 | 0.5 | Do. |

EXAMPLE 3

50 grams (g.) of a graft polymer (composition weight ratio, PE:MMA = 2:1) of a high-density polyethylene (PE) (specific gravity = 0.965, M.I. = 4.5) and methyl methacrylate (MMA) and 50 g. of a wood powder/PMMA composite material (composition weight ratio, wood powder: PMMA=2:1) obtained by impregnating wood powder (pine, 10 mesh and smaller) with methyl methacrylate and causing the methyl methacrylate to polymerize were dry mixed in a Nauta mixer. The resulting mixture was press-formed for 10 minutes at 190° C. The article thus formed was tested and found to have excellent dimensional stability when it had absorbed water, high luster, and high rigidity.

Samples were similarly prepared of only the polyethylene and of a graft polymer of the polyethylene and methyl methacrylate (composition weight ratio, PE:MMA = 1:1).

The results of tests on all of these samples are indicated in table 3.

TABLE 3

| Run No. | Composition (percent by weight) | | | | Hardness | Rigidity (kg./cm.²) | Thermal shrinkage (percent) | Outer appearance |
|---|---|---|---|---|---|---|---|---|
| | PE/MMA graft polymer PE:MMA | | Wood powder/PMMA composite material Wood powder:MMA | | | | | |
| 1 | PE only (100) | | | | 21 | 8,500 | 2.1 | |
| 2 | 1:1 | 100 | | | 42 | 10,000 | 1.5 | Equivalent to PE. |
| 3 | 2:1 | 50 | 2:1 | 50 | 68 | 15,300 | 0.5 | Aventurine. |

EXAMPLE 4

50 g. of a graft polymer of a low-density polyethylene (PE) (specific gravity = 0.918, M.I. = 4) and methyl methacrylate (MMA) (composition weight ratio, PE:MMA = 2:1) and 50 g. of a wood powder/PMMA composite material wood powder: obtained by causing methyl methacrylate to impregnate a wood powder (pine, 10 mesh and smaller) and to polymerize were (composition weight ratio, MMA=2:1) dry mixed in a Nauta mixer, and the resulting mixture was press formed for 10 minutes at 190° C. The article thus formed was tested and found to have excellent dimensional stability after absorbing water, high luster, and high rigidity.

Samples were similarly prepared of only the polyethylene and of a graft polymer of the polyethylene and methyl methacrylate (composition weight ratio, PE:MMA=1:1).

The results of tests on these samples are indicated in table 4.

TABLE 4

| Run No. | Composition (percent by weight) | | | | Hardness | Rigidity (kg./cm.²) | Thermal shrinkage (percent) | Outer appearance |
|---|---|---|---|---|---|---|---|---|
| | PE/MMA graft polymer | | Wood powder/ PMMA composite material | | | | | |
| | PE:MMA | | Wood powder: MMA | | | | | |
| 1 | PE only | (100) | | | (¹) | 3,000 | 2.0 | |
| 2 | 1:1 | 100 | | | 20 | 5,000 | 1.1 | Equivalent to PE. |
| 3 | 2:1 | 50 | 2:1 | 50 | 37 | 9,000 | 0.7 | Aventurine. |

¹ Not measurable.

EXAMPLE 5

Approximately equal quantities of powders of 30-mesh and smaller size of pine, sugi (*cryptomeria japonica*), and birch were mixed, and into the resulting mixture a polypropylene powder of a M.I. = 4.2, specific gravity = 0.91, and particle size of 30-mesh and smaller was admixed in various proportions to form various mixtures. Each of the resulting mixtures was thoroughly deaerated in a suitable vessel, and then, to this mixture, a specific quantity of a solution prepared by mixing methanol and a vinyl monomer in a ratio of 1:4 was added. The various mixtures were mixed for periods of from 10 to 60 minutes to effect impregnation, after which each mixture was subjected to irradiation of 5 megarads at room temperature by a linear accelerator thereby to carry out polymerization.

Samples were similarly prepared with either wood powder or polypropylene only and the vinyl monomer solution.

The weight increase, rate, and conversion, as defined below, of the samples thus prepared and dried were determined.

The results as set forth in table 5 indicate that, in general, when polypropylene is caused to coexist with wood powder, the resulting conversion is higher than that in the case where only wood powder is used.

(Weight increase rate)
$$= \frac{(\text{Reaction products}) - (A)}{(\text{Weight (A) of wood powder} + \text{vinyl polymer})} \times 100$$

$$\text{Conversion} = \frac{\text{Reacted monomer}}{\text{Impregnated monomer}} \times 100$$

TABLE 5

| Run No. | Mixture composition (percent by weight) | | | | Weight increase rate (percent) | Conversion (percent) |
|---|---|---|---|---|---|---|
| | Base material | | Vinyl monomer | | | |
| | Wood powder | Polypropylene | Kind | Quantity added | | |
| 1 | 60 | | Methyl methacrylate | 40 | 19.3 | 28.9 |
| 2 | 80 | | do | 20 | | |
| 3 | 59 | 1 | do | 40 | 27.8 | 41.7 |
| 4 | 55 | 5 | do | 40 | 35.0 | 52.5 |
| 5 | 40 | 20 | do | 40 | 62.5 | 93.6 |
| 6 | 20 | 40 | do | 40 | 66.7 | 100 |
| 7 | 5 | 55 | do | 40 | 65.8 | 98.5 |
| 8 | 1 | 59 | do | 40 | 65.8 | 98.5 |
| 9 | | 60 | do | 40 | 66.2 | 99 |
| 10 | | 80 | do | 20 | 25.0 | 100 |
| 11 | 60 | | Styrene | 40 | 5.3 | 8.0 |
| 12 | 55 | 5 | do | 40 | 9.6 | 14.4 |
| 13 | 20 | 40 | do | 40 | 15.4 | 23.1 |
| 14 | 60 | | Methyl acrylate | 40 | 19.0 | 28.7 |
| 15 | 55 | 5 | do | 40 | 33.4 | 50.0 |
| 16 | 20 | 40 | do | 40 | 64.8 | 97.0 |
| 17 | 60 | | Divinylbenzene | 40 | 5.0 | 7.5 |
| 18 | 20 | 40 | do | 40 | 9.6 | 14.3 |
| 19 | 60 | | Vinylacetate | 40 | 15.3 | 23.0 |
| 20 | 20 | 40 | do | 40 | 45.2 | 68.0 |
| 21 | 60 | | Vinylpyridine | 40 | 13.2 | 21.5 |
| 22 | 20 | 40 | do | 40 | 33.4 | 50.1 |

EXAMPLE 6

Polyethylene powder of a M.I. = 4, specific gravity = 0.918, and particle size of 20-mesh and smaller was mixed with a weight ratio of 1:1 with pine wood powder of 20-mesh and smaller particle size, and the resulting mixture was placed in a suitable vessel. A solution prepared by mixing methanol and methyl methacrylate with a ratio of 1:3 by weight was added in a quantity of 40 percent by weight of the methyl methacrylate to the mixture in the vessel. The resulting mixture was mixed for 30 minutes to effect impregnation and then subjected to irradiation of 1 megarad at room temperature by gamma rays due to cobalt-60. The product thus formed was dried, and their weight increase rate and conversion were determined.

Samples were similarly prepared also with wood powder and with polyethylene singly without the other, and their weight increase rates and conversions were determined.

The results of these tests are set forth in table 6.

TABLE 6

| Run No. | Mixture composition (percent by weight) | | | Weight increase rate (percent) | Conversion (percent) |
|---|---|---|---|---|---|
| | Wood powder | Polyethylene | Methyl methacrylate | | |
| 23 | 60 | | 40 | 21.4 | 32 |
| 24 | 30 | 30 | 40 | 57.0 | 85.6 |
| 25 | | 60 | 40 | 57.3 | 86 |

EXAMPLE 7

Sugi (*cryptomeria japonica*) wood powder of 20-mesh and smaller size was mixed with an equal quantity by weight of a polyolefin polymer powder of 20-mesh and smaller size. The resulting mixture was deaerated under the vacuum of 2 mm. Hg in a suitable vessel. A solution prepared by mixing methanol and methyl methacrylate with a ratio of 1:5 was added to the mixture thus deaerated in a quantity of 40 percent by weight of the methyl methacrylate. After 60 minutes of mixing to effect impregnation, the mixture was subjected to irradiation of 3 megarads by an electron-beam from a linear accelerator. The reaction product was dried, and then its weight increase rate and conversion were determined.

A sample was similarly prepared for the case of the wood powder without the polymer.

The results of tests on the samples thus prepared are set forth in table 7.

TABLE 7

| | | Mixture composition (percent by weight) | | | | |
|---|---|---|---|---|---|---|
| | | Thermoplastic vinyl monomer | | Methyl meth- acrylate | Weight increase rate (percent) | Conversion (percent) |
| Run No. | Wood powder | Kind | Quantity added | | | |
| 26 | 60 | (*1) | | 40 | 14 | 21.0 |
| 27 | 30 | Polypropylene | 30 | 40 | 54.2 | 81.2 |
| 28 | 30 | Ethylene propylene copolymer (*2) | 30 | 40 | 54.7 | 82.0 |
| 29 | 30 | Polystyrene (*3) | 30 | 40 | 48.7 | 73.0 |
| 30 | 30 | Polyvinyl chloride (*4) | 30 | 40 | 52.3 | 78.5 |

Note: (*1) M.I.=4.2, Spec. gravity = 0.91
(*2) M.I.=1. Spec. gravity = 0.905
Propylene content = 90% by weight
(*3) M.I.=7. Spec. gravity = 1.05
M.I. according to ASTM, D-1238
(*4) Spec. gravity = 1.4

EXAMPLE 8

Pine wood powder of 20-mesh and smaller particle size was mixed with an equal quantity by weight of polypropylene powder of 20-mesh and smaller size, a M.I. of 4.2, and a specific gravity of 0.91, and the resulting mixture was placed in a suitable vessel. One part by weight of methanol was mixed with five parts of methyl methacrylate, and to the resulting mixture solution, azobisisobutylnitrile was added in a quantity of 1 percent with respect to the methyl methacrylate.

Next, 40 percent by weight of the methyl methacrylate in the above describe solution was added with respect to the wood powder/polypropylene mixture. The resulting mixture was mixed for 60 minutes to effect impregnation and then subjected to irradiation of 1.5 megarads by an electron-beam from a linear accelerator. The reaction product was dried, and then its weight increase rate and conversion were determined and found to be 54.7 percent and 82 percent, respectively.

A sample corresponding to the case of wood powder used singly was similarly prepared and tested, whereupon the weight increase rate was found to be 14.3 percent, and the conversion was found to be 22 percent.

tained by the procedures set forth in examples 5, 6, and 7 were press formed at 190° C. for 10 minutes into test specimens, which were tested for certain physical properties. The results were as shown in table 8.

Measurements were made in accordance with the following specifications.

Rigidity: ASTM, D747
Hardness: ASTM, D785-51
Thermal shrinkage: 190° C./press formed
Water absorptivity: 20° C., 24 hr.

TABLE 8

| | | Composition (percent by weight) | | | | | | | |
|---|---|---|---|---|---|---|---|---|---|
| | | Thermoplastic resin | | Vinyl monomer | | | | | |
| Run No. | Wood powder | Kind | Quantity added | Kind | Quantity added | Rigidity (kg./cm.²) | Hardness | Thermal shrinkage (cm./cm.) | Water absorptivity (wt.%) |
| 27 | | Polypropylene | 100 | | | 10,500 | R-67 | 0.15 | 0.001 |
| 13 | 30 | do | 30 | Methyl methacrylate | 40 | 23,200 | L-80 | 0.003 | 0.12 |
| 20 | 20 | do | 40 | Styrene | 40 | 19,000 | L-75 | 0.003 | 0.12 |
| 20 | 20 | do | 40 | Vinyl acetate | 40 | 11,000 | | 0.003 | 0.11 |
| 29 | | Polystyrene | 100 | | | 35,000 | M-70 | 0.005 | 0.001 |
| | 30 | do | 30 | Methyl methacrylate | 40 | 41,000 | M-80 | 0.0001 | 0.12 |
| 30 | | Polyvinyl chloride | 100 | | | 47,000 | R-100 | 0.003 | 0.001 |
| | 30 | do | 30 | Methyl methacrylate | 40 | 62,000 | L-110 | 0.0001 | 0.12 |
| | | Hard board | 100 | | | | | | (¹) |
| | | Wood (Sugi) | 100 | | | | | | (¹) |

¹ More than 30.

NOTE.—Polypropylene, M.I.=4.2, spec. gravity=0.91; Polystyrene, M.I.=0.54, spec. gravity=1.05; Polyvinyl chloride, P=1,100, spec. gravity=1.4; Hard board, Moisture content=8%, spec. gravity=0.95, Oil treated; Sugi (*Cryptomeria japonica*), Moisture content=13%, spec. gravity=0.3.

EXAMPLE 9

Pine wood powder of 20-mesh and smaller size was mixed with an equal weight of polypropylene powder of 20-mesh and smaller size, a M.I. of 4.2, and a specific gravity of 0.91, and the resulting mixture was subjected to electron-beam irradiation of 2 megarads by means of a linear accelerator. Next, the mixture thus irradiated was placed in a reaction vessel and deaerated, and then a 20-percent methanol solution of methyl methacrylate was added to the mixture in a quantity of 60 percent by weight of the methyl methacrylate. The resulting process materials were caused to react at 70° C. for 60 minutes. The resulting reaction product was dried, and its weight increase rate was determined and found to be 31 percent.

Similarly, the weight increase rate was determined for a similar sample prepared with the use of wood powder without the polypropylene and found to be 7 percent.

EXAMPLE 10

A number of samples of the compositions for forming ob-

We claim:

1. A particulate material for forming articles which comprises a particulate polyolefin polymer selected from the group consisting of homopolymers and copolymers of a monomer selected from the group consisting of ethylene, propylene, and butene-1, a second thermoplastic polymer selected from the group consisting of lower-alkyl methacrylate polymers and styrene polymers, and particulate cellulosic material, said second thermoplastic polymer having a second-order transition point above 40° C., a part thereof graft-copolymerized to said polyolefin polymer; and another part thereof is within said particulate cellulosic material and graft-copolymerized to the cellulosic material; and a remaining part substantially adhering to the surfaces of said particulate polyolefin polymer and particulate cellulosic material.

2. A particulate material for forming articles as claimed in claim 1 in which said particulate cellulosic material is particulate wood.

3. A method for producing the particulate material of claim 1 which comprises irradiating with ionizing radiation rays a mixture of (1) a particulate polyolefin polymer selected from the group consisting of homopolymers and copolymers of a monomer selected from the group consisting of ethylene, propylene, and butene-1, (2) a particulate cellulosic material, and (3) a vinyl monomer which is to produce a thermoplastic polymer having a second-order transition point above 40° C., which mixture contains substantially no free, continuous phase of said vinyl monomer thereby to produce a product which is substantially particulate.

4. A method for producing particulate material for forming articles as claimed in claim 3 in which said vinyl monomer is sorbed by said particulate polyolefin and cellulosic material.

5. A method for producing particulate material for forming articles as claimed in claim 3 in which said vinyl monomer is in the form of an alcoholic solution.

6. A method for producing particulate material for forming articles as claimed in claim 3 in which said particulate cellulosic material is particulate wood.

* * * * *